United States Patent Office 2,881,530
Patented Apr. 14, 1959

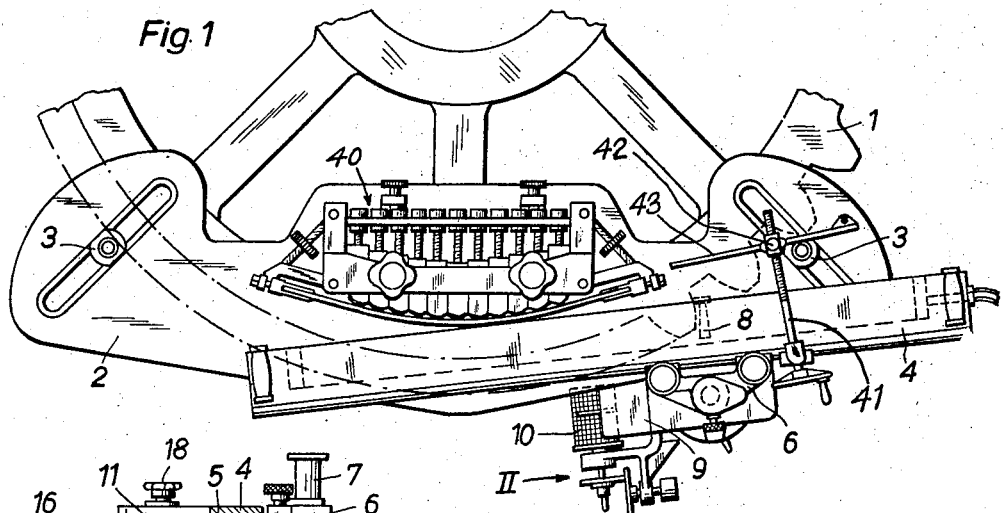

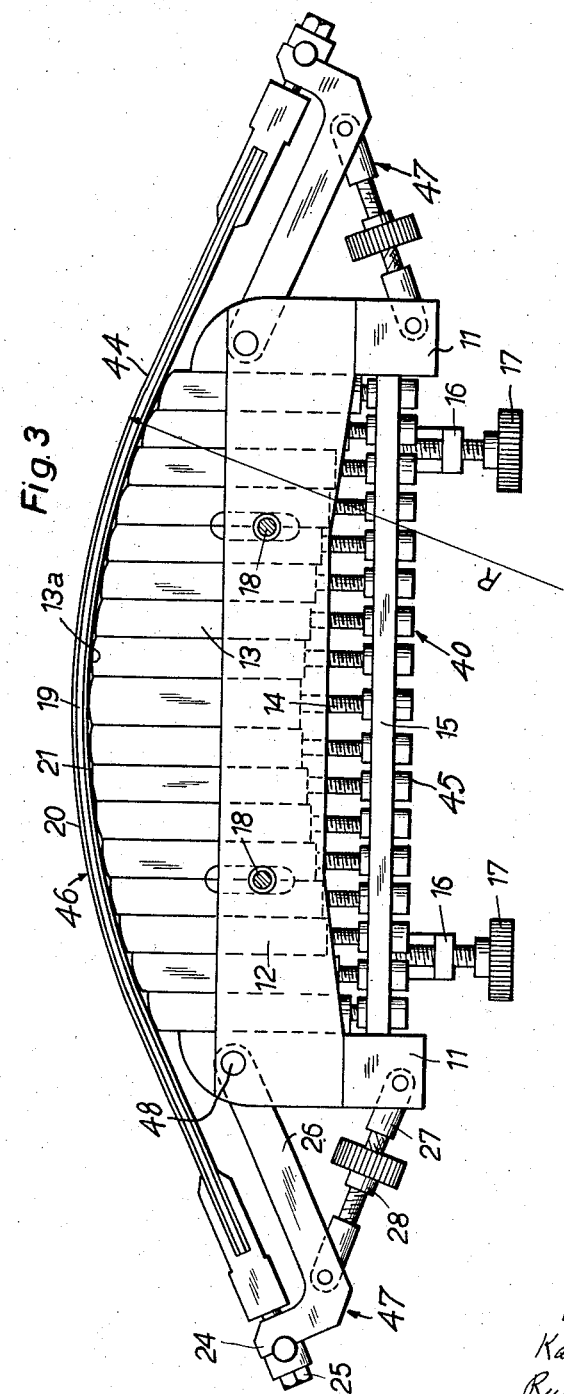

2,881,530

APPARATUS FOR TESTING THE PROFILES OF INVOLUTE GEAR TEETH

Karl Müller and Rudolf Rötheli, Zurich, Switzerland, assignors of one-third to Maag Gear-Wheel and Machinery Company, Ltd., Zurich, Switzerland, a body corporate of Switzerland Application March 18, 1957, Serial No. 646,672

3 Claims. (Cl. 33—179.5)

This invention relates to apparatus for testing the profiles of involute gear teeth.

It is known to provide such apparatus which comprises a plate adapted to be secured to a gear wheel of which the teeth are to be tested, a first rolling element having an arcuate surface of radius equal to the radius of the base circle of the said gear wheel, said first rolling element being secured adjustably to said plate so that said arcuate surface may be disposed concentric with the axis of said gear wheel when the said plate is secured to said gear wheel, a second rolling element having a straight-edge adapted to be attached to said first rolling element so that said straight-edge may roll on said arcuate surface without sliding, a carriage mounted adjustably on said second rolling element, and a measuring and recording device mounted on the carriage and including a feeler and indicating means said feeler being adapted to engage a flank of a tooth of said gear wheel and to actuate said indicating means when the said first and second rolling elements roll relatively to each other.

The said first rolling element is adjustably mounted on the said plate so that it may be brought to and secured in the correct operative position with the said arcuate surface coincident with the base circle of the gear which is to be tested. Consequently, in apparatus of the kind referred to, a separate first rolling element, having an arcuate surface corresponding to the base circle of the gear, has to be prepared for each size of gear, as to diameter, which is to be tested.

The object of the present invention is to provide an improved first rolling element which can be used in the testing of a plurality of sizes of gear.

According to the present invention, in an apparatus of the kind referred to, the first rolling element comprises a frame adapted to be secured to the said plate, a series of fingers disposed side by side in said frame in parallel planes, and a flexible strip member disposed in contiguity with the outer ends of said fingers, said fingers being adapted to be moved in said planes relatively to said frame and to each other whereby they can be positioned to cause the contiguous flexible strip member to assume a contour with the outer face thereof conforming to an arc having a radius equal to that of the base circle of the gear which is to be tested.

The flexible member may be formed of laminations of metallic or other strip material. Means may be provided for putting said flexible strip member in tension.

Preferably, the outer ends of the said fingers are arcuate or otherwise curved.

An embodiment of the invention is illustrated in the accompanying drawings, wherein:

Fig. 1 is a plan view of a gear teeth testing apparatus embodying the invention;

Fig. 2 is a fragmentary elevation, partly in section, looking in the direction of arrow II in Fig. 1;

Fig. 3 is a plan view on an enlarged scale of the rolling element included in Fig. 1; and Figs. 4 and 5 are an elevation, partly in section, and a plan view, respectively, of part of the element shown in Fig. 3.

Referring to Figs. 1 and 2, a supporting plate 2, of non-magnetic material, is secured by means of screws 3 and a plate 3a to one end face of a gear wheel 1 of which the teeth are to be tested. A first rolling element 40, shown in detail in Fig. 3, is mounted on the supporting plate 2, with screws 18 which pass through slots 2a in the supporting plate, so that the element 40 can be adjusted and secured in position on the plate. A second rolling element, comprising a straight-edge 4 provided with a magnet coil 5, is mounted on the supporting plate 2 so as to roll on the element 40; such rolling movement is effected by means of a screw-threaded spindle 41 rotatably mounted on the element 4 and engaging a nut 42 mounted on a retaining means 43 secured to the plate 2.

A sliding carriage 6 slides along a dovetail guideway on the straight-edge 4 and can be secured in any desired position. The sliding carriage 6 is provided with a post 7 which slides axially therein, and a feeler member 8, which is adapted to contact a flank of a tooth of a gear 1, is mounted on the post 7. The feeler 8 is associated with a recording device 9, 10, in the manner disclosed more fully in the specification of my pending application Serial No. 465,642 which also describes the arrangement of the carriage 6. The feeler 8 and recording device 9, 10 can be displaced, with the post 7, parallel to the axis of the gear 1.

The arcuate surface of the element 40 on which the straight-edge 4 rolls must conform to the base circle of the teeth on gear 1, as regards both radius of curvature and position. Fig. 3 shows the rolling element 40, the arcuate surface 44 of which is adjustable to the required radius R. The rolling element 40 comprises a number of fingers 13 which are parallel to each other and which are mounted in a frame 11, 12 so as to slide therein. The outer ends 13a of the fingers 13 are curved. Each finger 13 is engaged by a screw bolt 14, the head 45 of which is rotatably mounted in a bar 15 of the frame 11. Fixed to the supporting plate 2 are two brackets 16 in which adjusting screws 17 are engaged, the screws also engaging the bar 15 of element 40 and serving to displace the rolling element 40 on the plate 2; the element 40 is secured in position on the plate 2 by means of two screws 18.

The curved ends 13a of the adjustable fingers 13 cannot, of course, by themselves form a smoothly extending arc. Consequently, a flexible strip member 46 provides the arcuate surface 44 and comprises a laminated assembly of two relatively thick outer strips 20, 21 between which are disposed loosely a series of thin strips 19. The strip member 46 is laid on the curved ends 13a of the fingers 13 and connected by two tensioning devices 47 to the frame 11, 12. Each tensioning device 47 comprises a tension member 22 (Figs. 4 and 5) which is secured to an end of the outer strip 21 of the strip member 46 and which is engaged by a screw bolt 25, which also engages a member 24. The member 24 is carried on the outer end of an arm 26 which is connected at its inner end pivotally, at 48, to the frame 11, 12; the outer end of the arm 26 is also connected to the outer end of an adjustable strut 27, of which the inner end is also connected to the frame 11, 12. The strut 27 is adjustable in length by means of a screw 28. The other outer strip 20 of the strip member 46 is secured at its ends to a tension member 23 of each tensioning device 47, and the said tension member has formed on it a screw bolt 23b which passes through a part of the tension member 22 and is engaged by a nut 23a. By actuating the screw bolt 25 and/or the screw 28, the strip 21 can be placed in tension so as to abut the ends 13a of all of the fingers 13. Thereafter, the outer strip 20 is placed in tension by tightening the nut 23a on the bolt 23b. Lateral movement in the strip member 46 of the inner thin strips 19 thereof is prevented by stops 29 formed on or secured to the tension member 22.

What we claim and desire to secure by Letters Patent is:

1. An apparatus for testing the profiles of involute gear teeth on a stationary gear wheel, comprising a first rolling element consisting of a frame adapted for mounting on the gear wheel, said frame having mounted thereon a flexible arcuate member, a series of adjustable fingers and tensioning devices whereby the flexible member may be tensioned in contiguous engagement with the outer ends of the fingers to assume a contour conforming to an arc having a radius equal to the base circle of the gear wheel; a straight edge member in rolling, non-slipping contact with the flexible arcuate member; and an adjustable recording device having a feeler for contacting the tooth flank to be tested, said flexible arcuate member consisting of a laminated assembly of relatively thin strips overlying one another disposed between two relatively thick strips, which latter are each connected for individual tensioning by the tensioning devices, and said series of fingers being mounted in side-by-side parallel relation for independent movement.

2. An apparatus according to claim 1 wherein the frame member is mounted on a plate adapted to be secured to the gear wheel to be tested, the series of fingers are mounted in slidable relation to each other and each finger is adjustable in the frame by screw threaded means.

3. An apparatus according to claim 1 wherein the relatively thin inner strips are formed of steel and electromagnetic means are provided for magnetically coupling the flexible arcuate member and the straight edge member for non-slipping rolling engagement.

References Cited in the file of this patent

UNITED STATES PATENTS

| | | |
|---|---|---|
| 1,670,456 | Lange | May 22, 1928 |
| 2,217,998 | Buttress | Oct. 15, 1940 |
| 2,336,550 | Kruper | Dec. 14, 1943 |
| 2,337,144 | Young | Dec. 21, 1943 |
| 2,677,310 | Campbell | May 4, 1954 |
| 2,725,776 | Hopkins | Dec. 6, 1955 |

FOREIGN PATENTS

| | | |
|---|---|---|
| 374,586 | Germany | Apr. 24, 1923 |
| 746,586 | Great Britain | Mar. 14, 1956 |